United States Patent [19]

Martin, Sr.

[11] 4,279,583

[45] Jul. 21, 1981

[54] APPARATUS FOR THE AUTOMATED MANUFACTURE OF HEAVY CONCRETE OBJECTS

[76] Inventor: A. Eugene Martin, Sr., R.D. 1, P.O. Box 443, Narvon, Pa. 17555

[21] Appl. No.: 131,060

[22] Filed: Mar. 17, 1980

[51] Int. Cl.[3] .......................... B28B 5/04; B29C 5/10

[52] U.S. Cl. .................................... 425/253; 425/404; 425/447; 425/453

[58] Field of Search ................... 425/88, 253, 99, 135, 425/259, 210, 225, 226, 231, 232, 237, 404, 444, 445, 446, 452, 453, 447; 198/572, 577, 465, 469, 470, 561, 562, 566, 567, 783, 788, 793, 580, 472, 489, 721, 747; 264/333

[56] References Cited

U.S. PATENT DOCUMENTS

| | | | |
|---|---|---|---|
| 1,223,834 | 4/1917 | Sänger | 264/82 |
| 2,575,462 | 11/1951 | Nugey | 425/74 |
| 2,681,136 | 6/1954 | Ipsen | 198/472 |
| 2,921,336 | 1/1960 | Crofton | 425/88 |
| 2,932,874 | 4/1960 | Ludwig et al. | 425/432 |
| 2,993,583 | 7/1961 | Sykes | 198/356 |
| 3,268,059 | 8/1966 | Hill | 198/457 |
| 3,545,733 | 12/1970 | Anderson | 432/64 |
| 3,576,246 | 4/1971 | Hulet | 198/457 |
| 3,642,158 | 2/1972 | Koennecke | 198/472 |
| 3,659,986 | 5/1972 | Gelbman | 425/88 |
| 3,842,962 | 10/1974 | Grachen et al. | 198/783 |
| 3,902,588 | 9/1975 | Sato | 198/787 |
| 3,959,422 | 5/1976 | Wilhelm | 264/23 |
| 3,982,874 | 9/1976 | Nobbe | 425/88 |
| 3,986,605 | 10/1976 | Dooley et al. | 198/747 |
| 4,093,690 | 6/1978 | Murray | 264/83 |

FOREIGN PATENT DOCUMENTS

| | | | |
|---|---|---|---|
| 1431686 | 12/1968 | Fed. Rep. of Germany | 198/572 |
| 2370709 | 11/1976 | France | 425/88 |
| 853036 | 11/1960 | United Kingdom | 198/482 |

*Primary Examiner*—W. E. Hoag

[57] ABSTRACT

An apparatus is provided for the automated manufacture of heavy concrete objects, which apparatus may incorporate a continuous, rectangular assembly line path having a roller conveyor system for carrying molded concrete castings from a pouring station through a first and a second curing chambers to a stripping station, this roller conveyor system transcribing a closed rectangular layout with four right angle turns therein.

14 Claims, 6 Drawing Figures

APPARATUS FOR THE AUTOMATED MANUFACTURE OF HEAVY CONCRETE OBJECTS

BACKGROUND OF THE INVENTION

This inventon relates to manufacturing apparatus for the automated manufacturing of cast concrete objects and specifically relates to equipment used for the manufacture of large, heavy concrete castings such as concrete pipe, manholes and similar objects.

Concrete structures have for many years been cast on the job, a specific mold having been built-up specifically for each concrete pouring and then stripped-down following the curing of the object. With the standardization of building materials and the application of mass production techniques to the building industry, various processes and apparatus for carrying out these processes have been developed which are directed toward the automated manufacture of poured concrete objects.

Nugey, U.S. Pat. No. 2,575,462, teaches an apparatus for curing building blocks. These building blocks are of typical size and may range in weight up to 20 lbs. or more each. Each block is pressure formed into a semi-hard structure and then entered into an automated curing apparatus. This apparatus transports each block through a curing chamber layed out to meander along parallel lines whereby the path folds upon itself several times. A conveyor belt system operates within the curing chamber. A guide bar structure facilitates the flow of blocks around bends and acts to reduce blockages.

Ludwig et al, U.S. Pat. No. 2,932,874, teach an apparatus for manufacturing concrete pipe. This apparatus includes a continuous transfer mechanism which is built in a circle configuration. This circular transfer mechanism includes a rotating girder-type table structure which operates upon a circular track, similar to train rails or crane rails, and utilizes crane wheels for rolling thereon. A circularly shaped canvas curtain forms a toroidal shaped concrete curing chamber through which the rotating table carries objects to be cured by steam heat.

Lovell, U.S. Pat. No. 3,957,937, like Ludwig et al teaches a carrousel-type apparatus. The Lovell apparatus includes an endless tunnel formed by a circular toroidal housing. A super heated steam and carbon monoxide environment is created in the curing chamber portion of the Lovell apparatus.

What is desired now, however, is a manufacturing apparatus capable of use in the automated manufacture of heavy poured concrete objects, wherein a concrete structure once poured, is cured within a relatively short period thereafter under controlled environmental conditions, this automated curing apparatus being laid out in a compact, space saving configuration within a manufacturing facility.

An objective of this invention is to provide an automated concrete assembly curing apparatus utilizable for the manufacture of large and heavy poured concrete objects.

A second objective of this invention is to provide such an apparatus with a rectangular layout whereby a first pair of opposite end legs of the rectangle may be relatively short, providing for a rather compact and space saving layout for the apparatus.

A third objective of this invention is to provide such an apparatus with a first and a second superheated steam curing chambers, each chamber being positioned along one of said longer legs of said rectangular layout.

A further objective of this invention is to provide such a manufacturing apparatus wherein roller conveyors are utilized to form the assembly layout, the shorter legs of this rectangular layout being comprised of live rollers, these live roller sections being open and readily accessible.

Another objective of this invention is to provide the longer legs of the rectangular assembly layout with undriven roller conveyor sections.

An even further objective of this invention is to provide a right angle roller turn box at each of the four corners of the rectangular layout.

SUMMARY OF THE INVENTION

The objects of this invention are realized in an apparatus for the automated manufacture of heavy concrete objects whereby an assembly-line type manufacturing operation is carried out. A combination live and slave roller conveyor system is laid out to form a rectangular closed pathway. This roller conveyor pathway has two long legs comprising undriven slave rollers and two relatively short end legs comprising driven or live rollers.

A plurality of concrete molds may be employed. Each mold may be secured to a flat, rectangular pallet whereby each of the pallets may be of a size to fit precisely upon the rectangular roller conveyor system.

A pouring station may be positioned along one of the two short driven roller conveyor sections. A first longer curing chamber may be situated about a fist one of the undriven or gravity sections, i.e. longer legs, of the roller conveyor. A second and shorter curing chamber may be positioned about the other undriven or gravity roller section. Each curing chamber covers the roller conveyor section and provides an environment for rapidly curing a poured concrete form within a mold. Each chamber may be constructed as a straight tunnel.

A stripping station may be situated at the end of the second curing chamber along the shorter gravity roller conveyor leg. Both of the driven roller conveyor legs may be uncovered, facilitating access to the conveyor at those locations during jam-ups.

A right angle turn transfer box may be located at each of the four corners as part of the rectangular conveyor system. Each transfer box connects a live roller conveyor section with a gravity roller conveyor section.

Hydraulic rams may be positioned along each gravity roller conveyor leg for moving a plurality of mold pallets along those respective sections of the roller conveyor. Pallets are moved contiguously with each pallet in contact with and pushing against the one before it.

BRIEF DESCRIPTION OF THE DRAWINGS

The operation, features and advantages of this invention will be readily understood from a reading of the following detailed description of the invention in conjunction with the attached drawings, wherein like numerals refer to like elements and wherein.

DETAILED DESCRIPTION OF THE INVENTION

Figure 1:
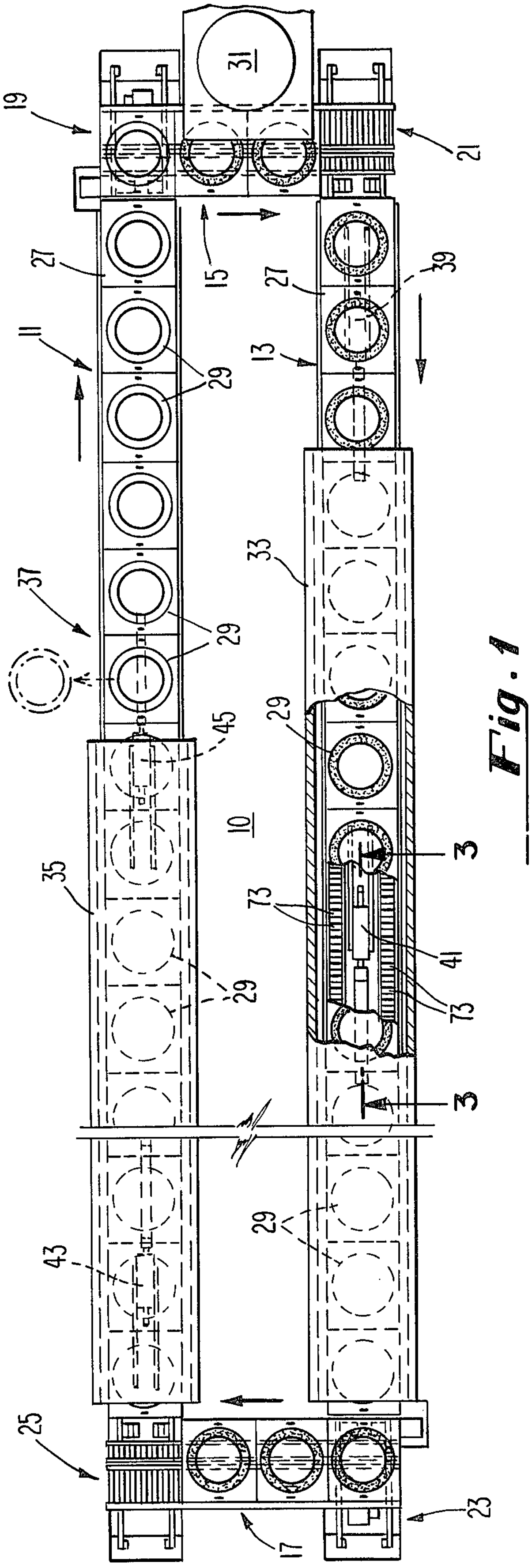
FIG. 1 is a plan view of the general layout of the apparatus of the invention.

An apparatus for the automated manufacture of heavy concrete objects 10, FIG. 1, has a rectangular layout of equipment for conducting this manufacture in assembly line fashion. A first and second straight roller conveyor beds 11, 13, respectively, form two opposing longer legs of the rectangular roller conveyor layout. Each of the roller conveyor legs 11, 13, of the rectangular layout are approximately 109 feet long and can vary substantially depending upon the number of pallets and forms being used in the system. Each of these roller conveyors 11, 13 is comprised of undriven or slave rollers commonly called gravity rollers which are supported to rotate freely.

A first and second live roller conveyor beds, 15, 17, respectively, form the opposing shorter legs of the rectangular roller conveyor layout. Each of these live roller conveyor legs 15, 17, is approximately 14 feet long.

Four right angle roller turn boxes 19, 21, 23, 25 form the corners of the rectangular roller conveyor layout and connect the respective gravity roller legs 11, 13 to the respective live roller conveyor legs 15, 17. These right angle roller turn boxes 19, 21, 23, 25 each have an operating bed approximately 6 feet by 7 feet in size for handling pallets 27 each bearing a single mold 29 which travel on the conveyor 10. Gravity roller conveyor legs 11, 13 each have a roller bed approximately 6 feet wide between bumper guides, while the live roller conveyor legs 15, 17 have a roller conveyor bed approximately 7 feet wide between bumper guides. Pallets 27 are positioned on the gravity roller conveyor legs 11, 13 with their 7 foot dimension running longitudinally with the conveyor and on the live roller conveyor legs 15, 17 with their 6 foot dimension running longitudinally with the conveyor.

A concrete pouring station 31 is positioned over the first live roller conveyor bed 15. This roller conveyor bed 15 is capable of holding two pallets 27 with their respective molds 29 at a time. The pouring station 31 is capable of pouring concrete into two molds 29 at a time. Typically, each mold 29 is filled through an individual pouring spout component part of the pouring station 31. The pouring station 31 has two such concrete pouring spouts one positioned to operate from a higher track than the second and extending to the far side of a mold 29. Each pouring spout could follow an individual mold 29 as it traverses the first live roller bed 15 without interfering with another mold 29 pouring operation whether that mold preceded or followed the other mold 29. In this manner, while the pouring station 31 is capable of filling two molds 29 at once, these molds 29 in actuality are filled individually and sequentially, the apparatus of the pouring station 31 being structured to skip to successive molds 29 with alternate pouring spouts in order to allow a steady movement of molds 29 along that live roller conveyor leg 15.

A first longer curing chamber 33 is positioned to extend from an end of the second gravity roller conveyor leg 13 towards the second right angle roller turn box 21 adjacent to the discharge end of the pouring station 31 first live roller conveyor bed 15. This first curing chamber 33 is approximately 90 feet long and is actually a straight tunnel constructed of preformed concrete slabs, forming two walls and a roof thereof, to create a rectangular tunnelway. Each slab used in the construction of the first curing chamber 33 is approximately 8 feet high by 8 feet 6 inches wide.

A second shorter curing chamber 35 extends from an end of the first gravity roller conveyor 11 towards the right angle roller turn box 19 adjacent to the first live roller conveyor bed 15 and the pouring station 31. This shorter curing chamber 35 extends a distance of approximately 67 feet and is constructed in an identical manner and of identical sized concrete slabs as the first curing chamber 33. A stripping station 37 is located on an open section of the first gravity roller conveyor bed 11 near the discharge end of the second curing chamber 35.

First and second curing chambers 33, 35 each contain piping, valving, control instruments and other apparatus in order to produce and control a superheated steam environment which is readily acceptable for the rapid curing of cast concrete objects. Such piping, valving and control instruments can be of a standard design readily acceptable in the industry and of known technology.

The automated manufacture assembly apparatus 10, FIG. 1, is intended to have a material flow in the clockwise direction and operates as follows. The entire roller conveyor assembly 10 is filled with pallets 27, one pallet space at most being allowed empty adjacent to the right angle roller turn boxes 19, 21, 23, 25. Molds 29 are filled as they pass under the pouring station 31. The first live roller conveyor bed 15 discharges a pallet 27 bearing a filled mold 29 onto the second right angle roller turn box 21. This right angle turn box 21 effects a 90° change in direction of the pallet 27. Successive pallets 27 are lined up contiguously along the second gravity roller conveyor bed 13 and pass through the first curing chamber 33 to exit upon the third right angle turn box 23 which effects a 90° change in direction and discharges the pallet onto the second live roller conveyor bed 17. The second live roller conveyor bed discharges the pallet 27 onto the fourth right angle roller turn box 25 which again effects a 90° change in direction and discharges the pallet 27 into the second curing chamber 35. Pallets 27 continue to be lined up contiguously as they pass through the curing chamber 35 and onto an open section of the first gravity roller conveyor bed 11 whereupon they are stripped at the stripping station 37 and the cured concrete objects removed from the molds 29. Empty molds 29 are discharged onto the first right angle turn box 19 and onto the pouring station 31.

A pair of hydraulically operated rams 39, 41 are positioned along the second gravity roller conveyor bed 13, with the first of these rams 39 operating along the open section of this second gravity roller conveyor bed 13 and the second hydraulic ram 41 operating within the first curing chamber 33 section of the gravity roller conveyor bed 13. Similarly, a second pair of hydraulic rams 43, 45 operate along the first gravity roller conveyor bed 11 with the first of this pair of rams being a third hydraulic ram 43 operating within the second curing chamber 35 portion of the first gravity roller conveyor bed 11. The fourth of the hydraulic rams 45 operates at the open section of the first gravity roller conveyor bed 11. These rams 39, 41, 43, 45 hook onto pallets 27 and move the entire line of pallets 27 along the gravity roller conveyor beds 11, 13.

When operational, the entire automated apparatus 10 is filled, as discussed above, with pallets 27 and causes the pallets 27 to move as follows. The live roller conveyor beds 15, 17 drive the pallets onto the succeeding right angle roller turn boxes 21, 25. These right angle turn boxes 21, 25 contain active components for discharging a pallet 27 onto the respective gravity roller conveyor beds 13, 11. Pallets 27 line up touching one another and are moved along the gravity roller conveyor beds 11, 13 by the operation of the respective hydraulic rams 43, 45 and 39, 41. Right angle roller turn boxes 19, 23 operate identically to the other respective right angle roller turn boxes 21, 25.

It can readily be observed from the operation of the apparatus 10 described above, that the orientation of a given pallet 27 does not change during that pallets traversal around the rectangular roller conveyor layout. That is to say, the north side of a pallet 27 continues to point north throughout its traversal of the layout. In this way the mold 29 is subjected to minimal changes in direction. The relatively long legs 11, 13 of the rectangular apparatus layout 10 and the relatively short legs 15, 17 permit a minimum waste of space of the facility housing the apparatus 10.

Figure 2:
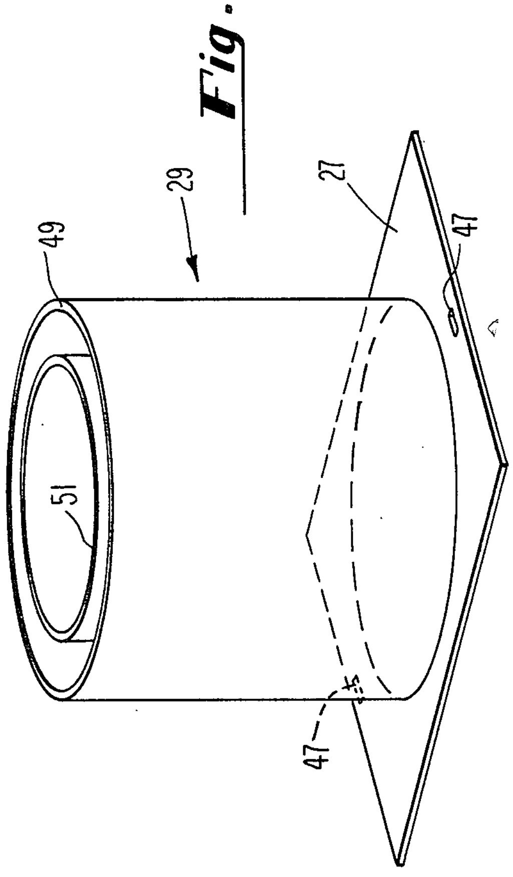
FIG. 2 shows a perspective view of a typical concrete mold situated on a typical steel plate pallet.

Each pallet 27 can be made from a 6 foot by 7 foot half inch thick steel plate, FIG. 2. Any number of different types of steels may be used for the pallet 27 including low carbon and high carbon steels, or chromium or magnesium alloy steels including stainless steel. A pair of two inch by two inch rectangular holes 47 extended through each pallet 27, one each, being positioned at about the center of a 6 foot side and about 6 inches in from that side edge of the pallet 27. These rectangular holes 47 are positioned to extend parallel to the respective edge of the pallet 27 and are intended as a notch for being engaged by one of a hydraulic rams 39, 41, 43, 45.

A mold 29 may be mounted on the pallet 27 and securely attached to the pallet 27 by welding or can be bolted to the pallet for ease of removal or may just rest on a pallet 27 without securement. When the concrete objects being manufactured are cylindrical pipe sections suitable for manholes, concrete duct work and similar construction, a cylindrical mold 29, FIG. 2 is used. This mold 29 has an outer cylindrical form 49 and an inner cylindrical form 51.

Figure 3:
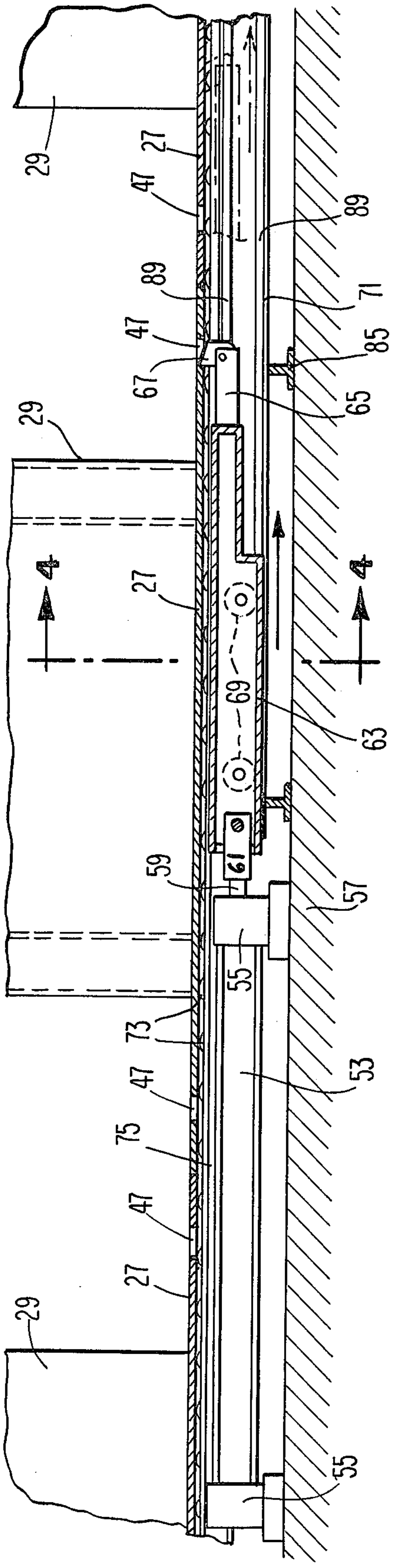
FIG. 3 shows a side elevational cross sectional view through an undriven roller conveyor leg showing a hydraulic cylinder and ram, as seen from the section taken from FIG. 1.

The hydraulic rams 39, 41, 43, 45 are identical, FIG. 3, and are electrically controlled to operate in unison. Each hydraulic ram 39, 41, 43, 45 includes a hydraulic cylinder 53, such as a Parker Manufacturing Co. hydraulic cylinder model 5G2H18X85 with a five inch bore and an 85 inch stroke. This cylinder is anchored to a pedestal 55 at either end thereof, whereby the pedestals 55 are anchored to grade 57. A two inch cylinder rod 59 operates from the hydraulic cylinder 53.

Extending from this cylinder rod 59 is a U-shaped plate 61 which is boltable to a ram carriage 63. This carriage 63 has an elongate rectangular shape which is narrowed at one end to support a ram arm 65 which carries a hook 67. The ram arm 65 can be made from a steel box channel or can be solid rectangular steel beam. Typically, the arm 65 protrudes about 12 inches beyond the end of the carriage 63.

The hook 67 is rectangularly shaped with a beveled top edge. This hook 67 is spring-loaded to yield towards the carriage 63 when it comes in contact with the underside of a pallet 27, and to spring into the upright position when a pallet notch 47 passes enabling engagement thereto.

The carriage 63 is mounted for movement under the conveyors 11, 13 by having two sets of trolley wheels 69 connected thereto. Trolley wheels 69 operate upon C-shaped crane wheel tracks 71 anchored to grade 57.

The first and second gravity roller conveyors 11, 13 have similar if not identical constructions. The hydraulic rams 39, 41, 43, 45 are each identically constructed with respect to these conveyors 11, 13. Each of the conveyors 11, 13 is made up of two parallel rows of undriven rollers 73, FIG. 4. Each roller 73 is supported on each end by a bearing supported by a C-channel 75. Each C-channel 75 acts to carry out a bearing journal and roller pedestal function. The undriven rolls 73 are each approximately 21 inches long with the distance between the outer face of the left and right C-channels 75 being about 24 inches.

Figure 4:
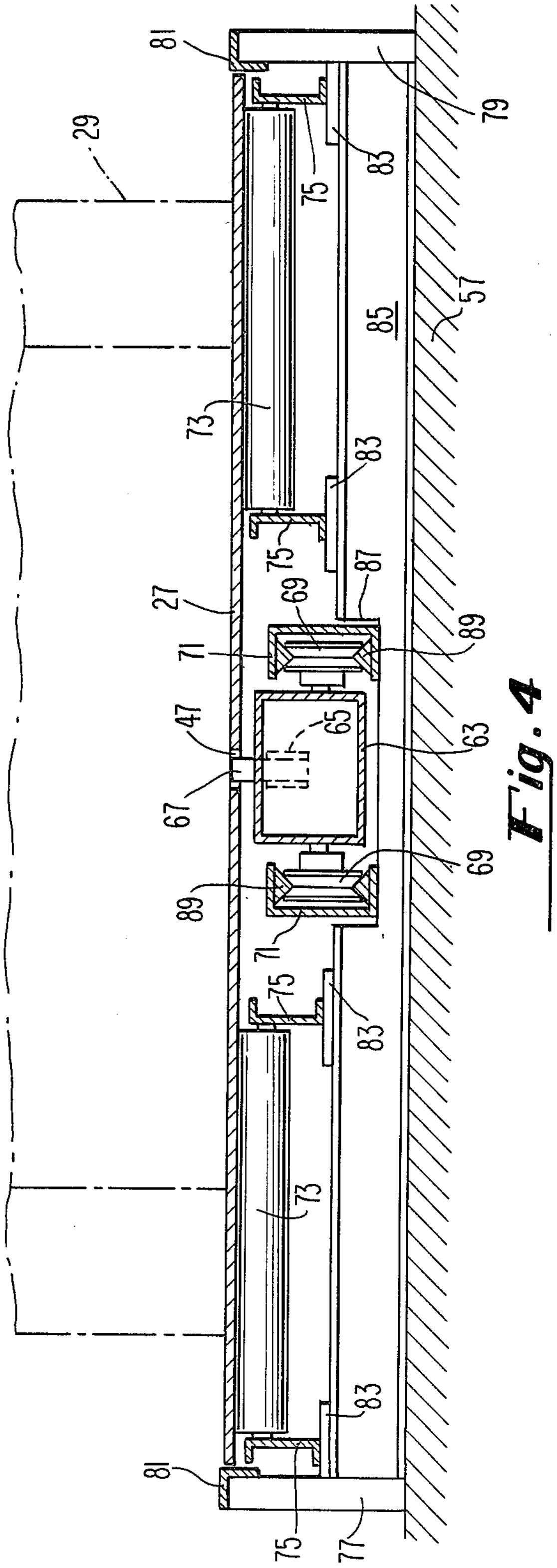
FIG. 4 is a cross sectional elevational view of the hydraulic ram and the undriven roller conveyor, as taken from FIG. 3.

Positioned to the outside of the rolles 73, FIG. 4, and forming the outside of the roller conveyor bed are left and right walls 77, 79 respectively. Each wall 77, 79 has a angle plate 81 mounted on the top thereof with one face extending downwardly on the inside of the respective walls 77, 79. These wall angle plates 81 protect the left and right walls 77, 79, which are typically constructed of concrete, and also act as bumper guides for the pallets 27 traveling along the conveyor bed. A space of about 24 inches exists between the left and right rows of rollers 73 in which the hydraulic rams 39, 41, 43, 45 operate.

The C-channels 75, which form the roller pedestals, are mounted to bearing plates 83. These bearing plates 83 run the length of the C-channel roller supports 75.

The bearing plates 83 are mounted to a base 85. This base 85 may either be a poured concrete base or may be comprised of a series of I-beams each running orthogonally across the longitudinal axis of the conveyor and secured to grade 57.

The rollers 73 are steel rollers commonly available in the marketplace from such suppliers as the Mathews Manufacturing Company. These rollers 73 are 2.5 inches in diameter and are spaced on 6 inch centers. Each roller will normally support about 600 lbs.

If the base 85 comprises a plurality of I-beams, fewer than one I-beam is used for each roller 73 pair. These I-beams may be spaced 60 inches apart with the bearing plates 83 sized to the dimensions of the flange of the I-beam. The C-channels 75 span the space between successive I-beams.

A hydraulic ram 39, 41, 43, 45 is positioned in the center of a roller conveyor bed and below the grade of the bearing plates 83. This positioning is enabled by having a notch 87 cut out of the base 85 which allows for the operation of the hydraulic cylinder 53 and the carriage 63 below the top of the rollers 73.

The carriage 63, FIG. 4 has a rectangular box like cross section from which the trolley wheels 69 extend. These trolley wheels 69 run in the C-shaped crane wheel tracks 71 which include a pair of "vee-shaped" bearing surfaces 89, one each mounted to the inside of each of the flanges of the C-shaped channel forming each crane wheel track 71. The trolley wheels 69 have vee-shaped running surfaces which mate with the vee-shaped bearing surfaces 89 of the crane wheel tracks 71.

In the FIG. 4, the ram arm 65 and the protruding hook 67 can be seen to be engaged with a pallet notch 47 of a pallet 27 bearing a concrete mold 29. With an 85 inch stroke, the hydraulic rams 39, 41, 43, 45 are capable of engaging either the leading or trailing pallet notches 47 for pulling the pallets along the conveyor beds 11, 13.

Figure 5:
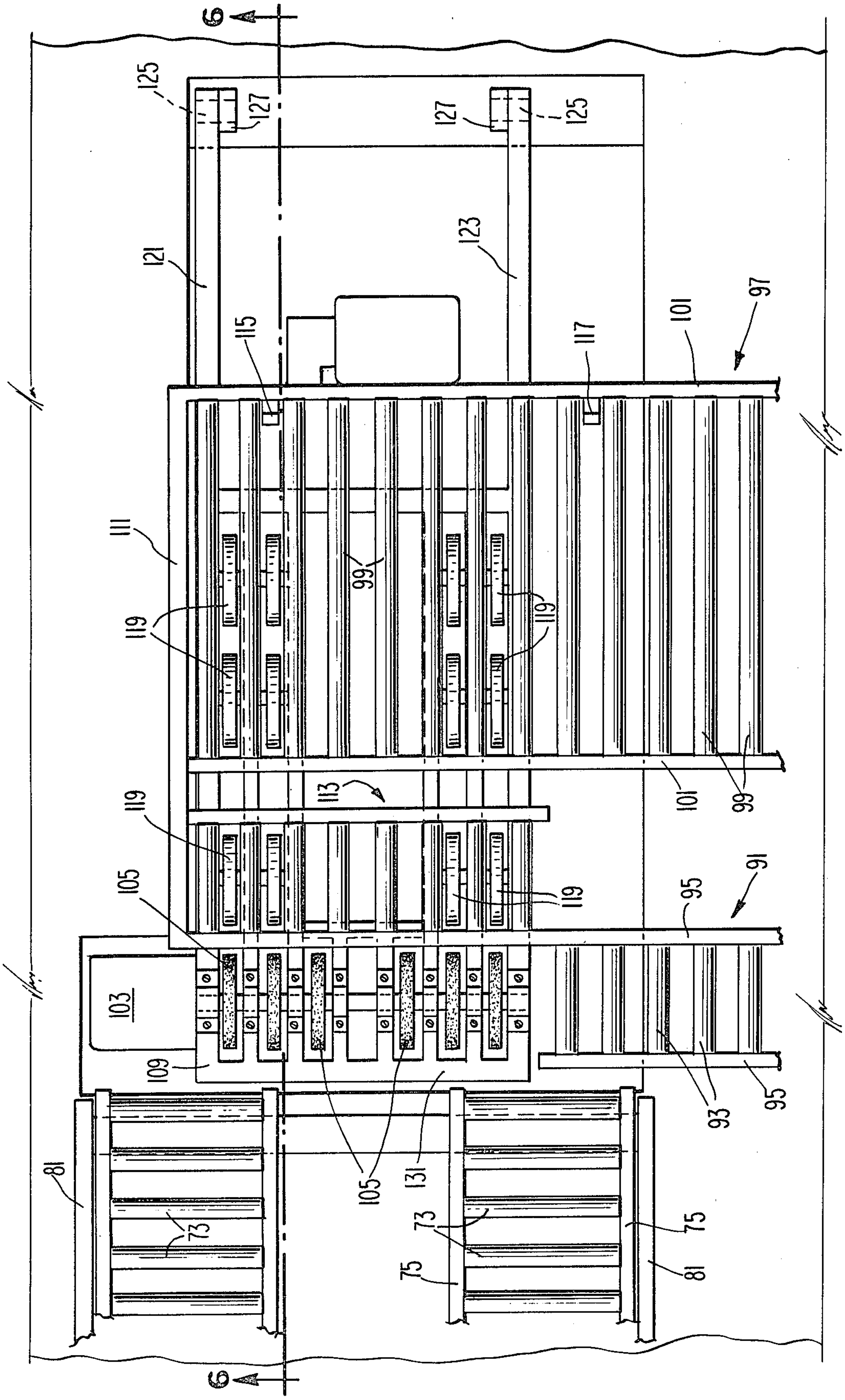
FIG. 5 shows a plan elevation of a right angle roller turn box.

The first and second live roller conveyor legs 15, 17, FIG. 5, comprise a roller conveyor bed approximately 7 feet wide. Each of these beds 15, 17 has an identical structure. It includes a first smaller gravity roller conveyor 91 used to carry pallets 27 out of a turn box and made up of 15 inch long Mathews Manufacturing Company 2.5 inch diameter rollers 93 on 6 inch centers. This gravity roller shift conveyor 91 is similar in structure to the first and second gravity roller conveyors beds 11, 13 having C-channel roller supports 95.

Spaced a distance of about 2 feet away from the first smaller gravity roller conveyor 91 is a wider driven or live roller shift conveyor 97.

This conveyor 97 is commonly available in the marketplace from the Hytrol Corporation and is a chain drive operated roller conveyor having 52 inch long rolls 99 which are 2.5 inches in diameter and spaced on 6 inch centers. These rolls 99 are mounted on supports 101 which allow them to be actively driven.

At the projected intersection of an extension of a gravity roller conveyor 11 or 13, and a live roller conveyor 15 or 17, is positioned one of the right angle roller turn boxes 19, 21, 23, 25, FIG. 5.

Each of the right angle roller turn boxes 19, 21, 23, 25 includes a motor 103 driven set of indexing rollers 105. This motor 103 is connected to a shaft 107 upon which six 12 inch diameter rubber indexing roller wheels 105 are mounted. These rubber wheels 105 are spaced over a three foot length of the motor shaft 107.

A bracket 109 supports the motor shaft 107, indexing roller wheels 105 and the motor 103 in position at the end of a gravity roller bed 11, 13 and with the motor shaft 107 positioned along the center line of a smaller gravity roller conveyor 91.

The live roller conveyor 97 extends a distance of about 4 feet 9 inches beyond the edge of the gravity roller conveyor bed 11 or 13 to become an integral part of the right angle roller turn box. The roll supports 101 terminate at an end support 111. This end support 111 runs perpendicular to the live roller conveyor 97 and ties in both of the roll supports 101 and the indexing roller bracker 109.

Like the live roller conveyor 97, the smaller gravity roller conveyor 91 extends beyond the edge of the gravity roller conveyor bed 11 or 13 to form part of the right angle turn box. This extension of the smaller gravity roller conveyor 91 into the right angle turn box is about 12 inches.

An offset small gravity roller conveyor 113 runs parallel to the indexing roller shaft 107 on the inside of the shaft 107 away from the gravity roller bed 11 or 13. This offset gravity roller conveyor 113 is of identical dimension as the smaller gravity roller conveyor 91. The C-channel support 95 for the smaller gravity roller conveyor 91 extends adjacent to the indexing roller bracket 109 to form one support of this offset, small gravity roller conveyor 113. This C-channel support 95 also ties into the end support 111.

A limit switch 115 is positioned along the 52 inch roller conveyor support 101 at the side of that conveyor 97 away from the live indexing rolls 105. This limit switch may be positioned almost anywhere along that support 101 but is conveniently placed inside the second roll 99.

A second or indicator switch 117 is positioned along the same support 101 as the limit switch 115. This indicator switch 117 is positioned near the discharge side of the right angle roller turn box.

Limit switch 115 and indicator switch 117 sense when a pallet 27 has entered upon the turn box and when it has been discharged from the turn box, respectively, which sensing controls the operation of a carriage. This carriage includes three rows of undriven transfer rollers 119. These rollers 119 are mounted upon a framework which includes a pair of pivotal carriage arms 121, 123.

Figure 6:
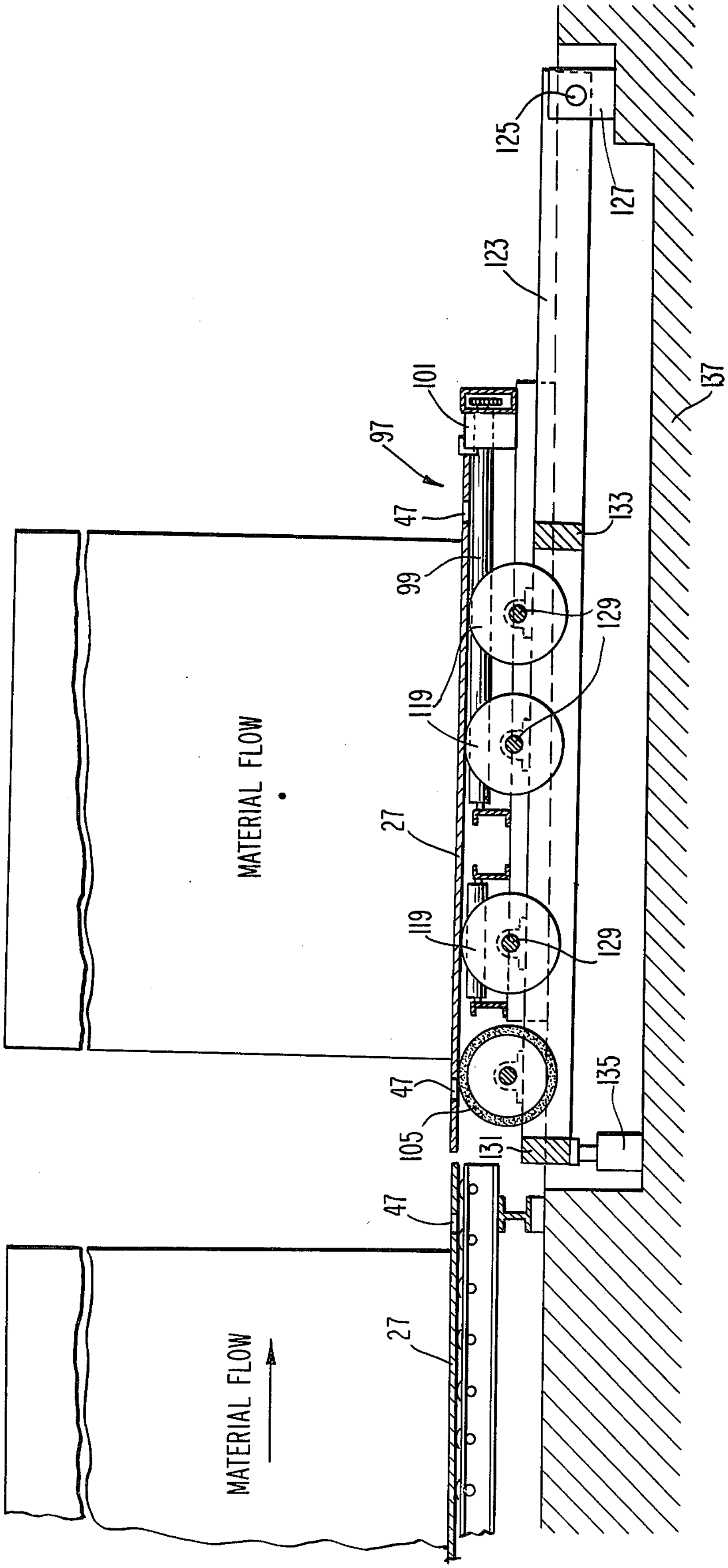
FIG. 6 shows a cross sectional elevational view through the right angle roller turn box, as taken from FIG. 5, showing the pivotal carriage assembly.

Each of the carriage arms 121, 123 pivots about a pin 125 supported by a bracket 127, FIG. 6. The undriven transfer rollers are paired on individual axles 129 to form three rows of double wheels supported from the pivotal carriage arms 121, 123, and cross members 131, 133 thereto. The live indexing rollers 105, motor shaft 107 and drive motor 103, as well as their support bracket 109, are also mounted to the pivotal carriage arms 121, 123 and the cross member 131, 133 structure.

A vertical operating hydraulic piston 135 is anchored to the foundation 137 of the right angle turn box to raise or lower the pivotal carriage structure via the pivotal carriage arms 121, 123.

When in operation, a pallet 27 will enter the turn box, FIG. 6, from the left, via the gravity roller conveyor bed 11 or 13, having been pushed along by the succeeding pallet 27 via the operation of one of the hydraulic rams 39, 41, 43, 45. Once a pallet 27 is pushed onto the live indexing rollers 105 it is moved by these rollers across the transfer box on the undriven transfer rollers 119 and thence to abut the limit switch 115 mounted on the far support 101. This signals the vertically operating hydraulic piston 135 to lower the pivotal carriage arms 121, 123 which also lowers the active indexing roller wheels 105 and the undriven transfer rollers 119. The undriven transfer rollers 119 are of an identical size and composition as the driven indexing roller wheels 105, i.e., they are 12 inch diameter rubber wheels. This lowering of the carriage arms 121, 123 and the roller wheels 105, 119 allows the pallet 27 to drop onto the live roller conveyor bed 15 or 17 where the live roller conveyor 97 including the active rolls 99 push the pallet out of the turn box in a direction to travel shown in the FIG. 6. Once a pallet 27 passes the indicator switch 117 indicating that it has exited a turn box, the vertically operating hydraulic piston 135 raises the carriage arms 121, 123 to raise the indexing roller wheels 105 and the transfer roller wheels 119 back up into position slightly above the active rolls 99 and the rolls of the offset gravity roller conveyor 113.

The interlaced arrangement of the indexing roller wheels 105 and the undriven transfer roller wheels 119 with the rollers of the offset small gravity roller conveyor 113 and the rollers of the live roller conveyor 97, as well as the raising and lowering of those wheels 105, 119 permits a right angle or orthogonal movement of material through the turn box apparatus.

Many changes can be made in the above described apparatus without departing from the intent and scope of the invention thereof. It is intended, therefore, that all matter contained in the above description and shown in the accompanying drawings be interpreted as illustrative and not be taken in the limiting sense.

What is claimed:

1. An apparatus for the automated manufacture of poured concrete objects comprising:

means for pouring concrete molded objects, means for curing said poured concrete objects, said curing means including a straight tunnel containing superheated steam, a stripping station for stripping said cured concrete objects, and means for conveying said objects, said conveying means passing by said pouring means and said stripping means and through said curing means, wherein said conveying means is a roller conveyor system, said roller conveyor system traversing a rectangular path containing four right angle turns, wherein two opposing sides of said roller conveyor system rectangular path are relatively long and extend relatively close to one another, further comprising a plurality of rectangular pallets, each said pallet bearing a mold for said poured concrete objects, said pallets being transferable around said roller conveyor system, wherein said roller conveyor system includes two parallel extending relatively long roller conveyors and two parallel extending relatively short roller conveyors, said two pairs of roller conveyors forming legs of said rectangular path, the apparatus further comprising four right angle roller turn boxes, said right angle roller turn boxes forming the corners of said rectangular path, wherein said pallets are disposed on said conveyor means and are adapted to be transferred around said two pairs of roller conveyors and said four right angle roller turn boxes forming said rectangular path with a constant orientation, wherein said relatively long roller conveyor pairs are each gravity conveyors, and wherein the relatively short of said four right angle turn boxes includes a first active drive member capable of moving one of said pallets in a first direction, and a second active drive member capable of moving one of said pallets in a second direction 90° from said first direction, said first active drive member being positioned interlaced with said second active drive member and movable to positions above and below said second active drive member, the apparatus also comprising a plurality of hydraulically operated means beneath the level of said gravity conveyors for pulling pallets along said pair of gravity roller conveyors.

2. The apparatus of claim 1 wherein said curing means straight tunnel is a first tunnel covering a first one of said pair of gravity roller conveyors.

3. The apparatus of claim 2 also including a second straight tunnel covering said second one of said pair of gravity roller conveyors.

4. The apparatus of claim 3 wherein said first and second tunnels each include piping, valving and controls therein for maintaining a concrete curing environment within said tunnels.

5. The apparatus of claim 4 wherein said curing environment is superheated steam.

6. The apparatus of claim 5 wherein said first and second tunnels are shorter in length than said respective first and second gravity roller conveyors, said second tunnel being also shorter in length than said first tunnel.

7. The apparatus of claim 6 wherein said plurality of hydraulically operated pallet pulling means includes four hydraulic rams, each said ram having a hook for engaging a pallet, said ram hook being operable horizontally to said gravity roller conveyor.

8. The apparatus of claim 7 wherein a first one of said hydraulic rams is positioned beneath said first gravity roller conveyor within said first tunnel area; a second one of said hydraulic rams is positioned beneath said first gravity roller conveyor at the uncovered portion thereof; a third one of said hydraulic rams is positioned beneath said second gravity roller conveyor within said second tunnel area; and a fourth one of said hydraulic rams is positioned beneath said second gravity conveyor at the uncovered portion thereof, said first, second, third and fourth hydraulic rams being connected to operate in unison.

9. An apparatus for the automatic manufacture of heavy concrete objects, comprising:

means defining a substantially rectangular closed conveyor path, the path having a pair of long legs and a pair of short legs, the long legs being many times longer than the short legs, a plurality of movable carrier means, disposed around the path, means for pouring concrete into a plurality of molds disposed on the carrier means, first and second curing means, disposed along the two long legs of the path, respectively, for curing concrete within the molds passing through the curing means, the first and second curing means being positioned such that the molds pass first through the first curing means and then through the second curing means, the long legs of the path having a plurality of undriven rollers for facilitating the movement of carrier means along the path, the short legs of the path having a plurality of driven rollers for facilitating movement of carrier means along the path, hydraulic means beneath the level of said undriven rollers for pulling said carriers, four right angle turn boxes, disposed at the corners of the path, the right angle turn boxes comprising means for transporting a carrier means around a corner without altering the orientation of the carrier means, and a stripping station for stripping the cured concrete objects from the molds, the stripping station being positioned between the second curing means and the pouring means.

10. The apparatus of claim 9, wherein the pouring means is at least as long as the length of two of the carrier means, as measured along the path.

11. The apparatus of claim 9, wherein the first and second curing means comprise tunnels capable of receiving the carrier means as the carrier means are moved around the path.

12. The apparatus of claim 9, further comprising engagement means operativey associated with said long legs of said path, for engaging a said carrier means and moving the carrier means of the leg associated therewith, along said leg of the path, wherein the right angle turn boxes comprise two sets of driven rollers, the rollers of the first set being interlaced with the rollers of the second set, the axis of rotation of the first set of rollers being perpendicular to the axis of rotation of the second set of rollers, the pouring means being at least as long as the length of two of the carrier means, as measured along the path, and wherein the first and second curing means comprise tunnels capable of receiving the carrier means as the carrier means are moved around the path.

13. The apparatus of claim 9, further comprising engagement means operatively associated with said long legs of said path, for engaging a said carrier means and moving the carrier means of the leg associated therewith, along said leg of the path.

14. The apparatus of claim 9, wherein the right angle turn boxes comprise two sets of driven rollers, the rollers of the first set being interlaced with the rollers of the second set, the axis of rotation of the first set of rollers being perpendicular to the axis of rotation of the second set of rollers, and further comprising means for raising and lowering one of the sets of driven rollers, relative to the other set of driven rollers.

* * * * *